Nov. 6, 1956 F. L. WASSELL ET AL 2,769,278
TREE BALLING DEVICE
Filed May 16, 1952
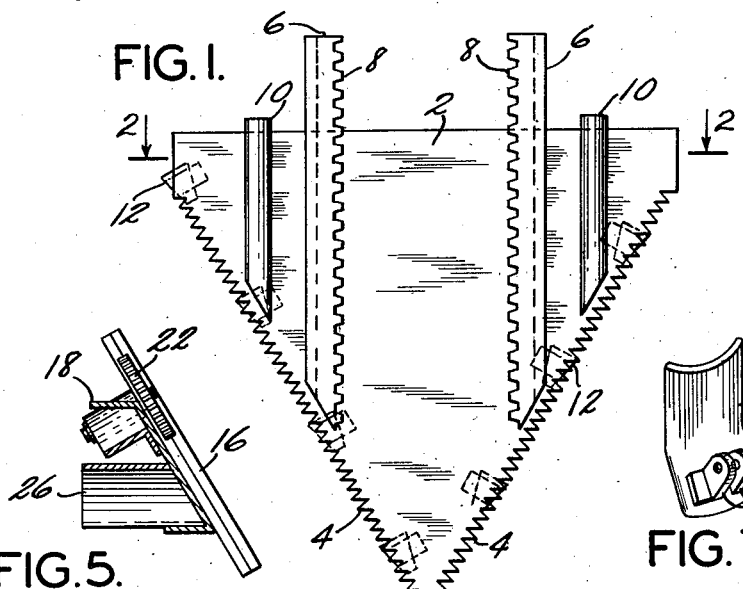
FIG. 1.
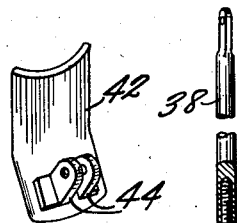
FIG. 7.
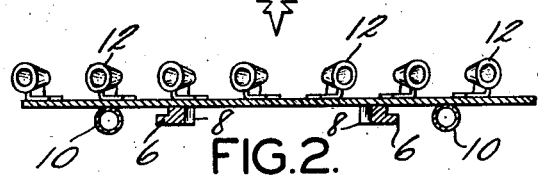
FIG. 2.
FIG. 8.
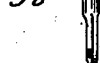
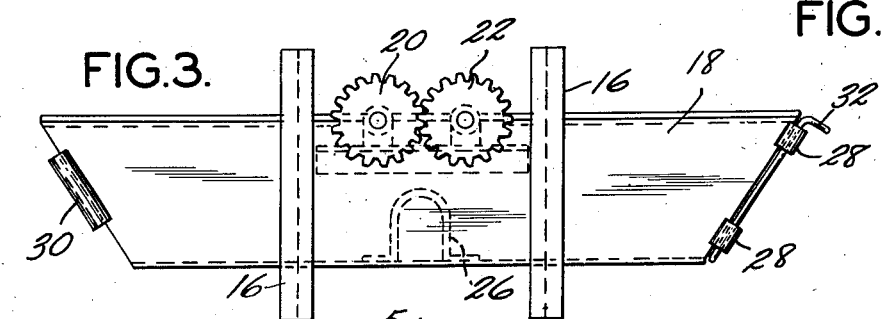
FIG. 3.
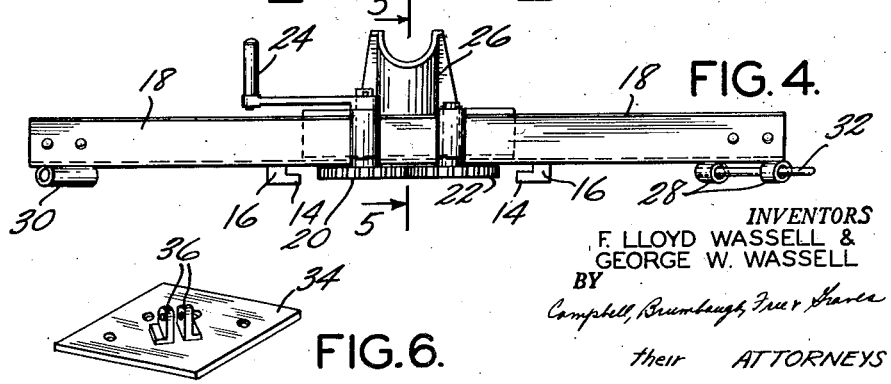
FIG. 4.
FIG. 6.
INVENTORS
F. LLOYD WASSELL &
GEORGE W. WASSELL
BY
Campbell, Brumbaugh, Free & Graves
their ATTORNEYS Nov. 6, 1956  F. L. WASSELL ET AL  2,769,278
TREE BALLING DEVICE
Filed May 16, 1952  6 Sheets-Sheet 2

INVENTORS
F. LLOYD WASSELL &
GEORGE W. WASSELL
BY
Their ATTORNEYS

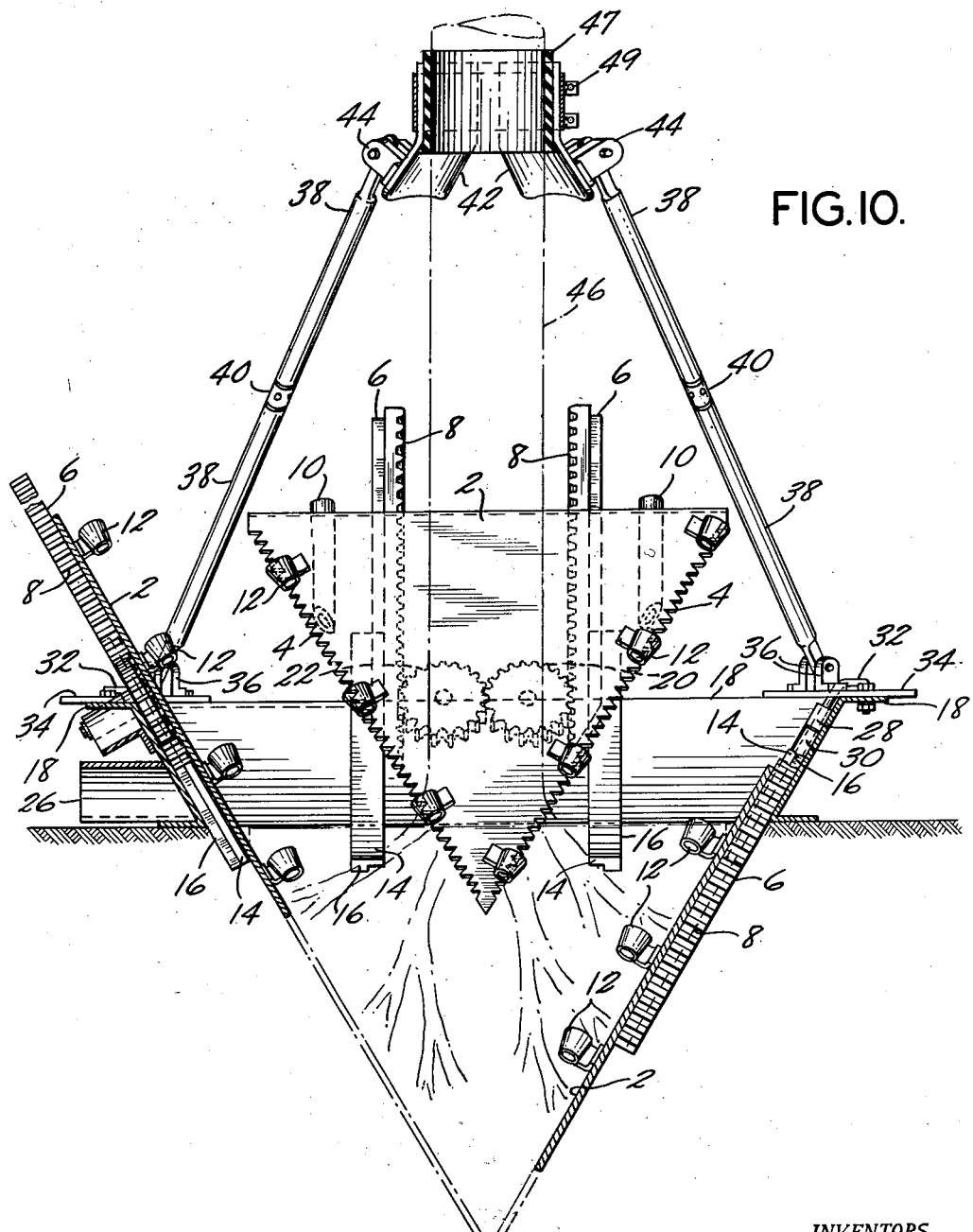

Nov. 6, 1956 F. L. WASSELL ET AL 2,769,278
TREE BALLING DEVICE
Filed May 16, 1952 6 Sheets-Sheet 5

INVENTORS.
F. LLOYD WASSELL &
GEORGE W. WASSELL
BY

Their ATTORNEYS.

INVENTORS.
F. LLOYD WASSELL &
GEORGE W. WASSELL

United States Patent Office 2,769,278
Patented Nov. 6, 1956

2,769,278

TREE BALLING DEVICE

Frank Lloyd Wassell and George W. Wassell, Westport, Conn.

Application May 16, 1952, Serial No. 288,176

10 Claims. (Cl. 47—37)

This invention relates to an excavating device and more particularly to a device for excavating tree balls whereby a living tree may be easily transplanted.

Using known methods of tree moving, the labor and time required to dig, ball, transport and transplant the tree make the purchase of a tree a luxury. The cost of moving trees from the path of a new highway, for example, is so great that the existing trees are destroyed and young trees are planted alongside the highway, thus losing for 10 to 30 years the beauty of the older trees.

It requires approximately three hours labor by two men to dig and ball a tree six inches in diameter and another six hours to replant it, plus the time of hauling. Further, even using extreme care, the present methods of moving trees often result in breaking of the fine hair roots.

It is an object of this invention to provide a device for transplanting trees, shrubs and the like which is quick and easy to operate, inexpensive to manufacture and which performs the transplanting operation with no damage to the tree.

The invention will be further illustrated by reference to the accompanying drawings, in which Figure 1 is a view in elevation of one side of a cutting plate employed in the device of the invention;

Figure 2 is a view in section, taken on the plane indicated by the line 2—2 of Fig. 1 and looking in the direction of the arrows, showing the cutting plate of Figure 1;

Figure 3 is a view in elevation showing one side of the frame of the device of the invention as it appears from the inside of the frame;

Figure 4 is a plan view of the frame shown in Figure 3;

Figure 5 is a sectional view taken on line 5—5 of Figure 4 and looking in the direction of the arrows;

Figure 6 is a perspective view of one of the frame corner brackets;

Figure 7 is a perspective view of one of the tree supporting plates;

Figure 8 is a plan view partly broken away and in section showing a turnbuckle support for the plate shown in Figure 7;

Figure 10 is a sectional view taken on the broken line 10—10 of Figure 9 and looking in the direction of the arrows;

Figure 9:
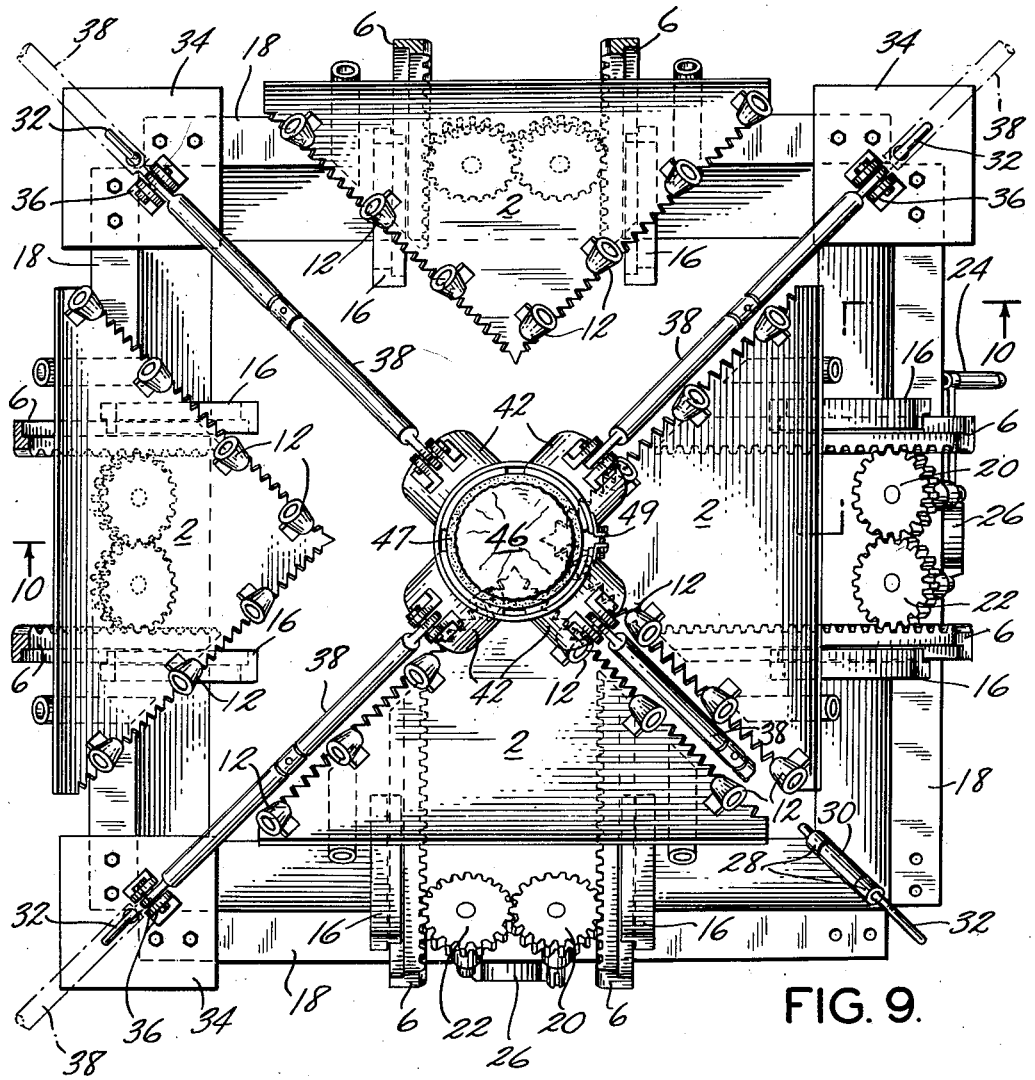
Figure 9 is a plan view of the assembled device as it appears in use with two cutting plates in a retracted position and two cutting plates in an inserted position.

Referring specifically to Figure 1 of the drawings, a cutting plate 2 is shown having a plurality of cutting teeth 4 on two edges thereof. Cutting plate 2 may be made of any desired material such as steel. Secured to cutting plate 2 are a pair of racks 6 having teeth 8 thereon. Mounted adjacent racks 6 are a pair of tubes 10, the lower ends of which are open and terminate adjacent the teeth 4 on plate 2. Racks 6 and tubes 10 may be secured to plate 2 by any conventional means such as welding. Mounted in staggered relationship on the opposite side of plate 2 from racks 6 are a plurality of hollow funnel shaped eyes 12.

Racks 6 are each provided with flanges as shown in Figure 2 which engage corresponding flanges 14 of brackets 16 mounted on frame members 18 as best shown in Figure 4.

As shown in Figures 3 and 4, pairs of meshing gears 20 and 22 are journalled on the frame members 18, gears 20 being mounted on shafts having cranks 24 secured to the opposite ends thereof. Below the gears 20 and 22 and upon the opposite sides of the frame members 18 are mounted U-shaped metal brackets 26, the function of which will be described hereinafter. Each of the frame members has mounted at the right-hand side thereof spaced hinge members 28 (as shown in Figure 3) while, at the left-hand side thereof hinge members 30 are provided. As shown in Figure 5, the U-shaped brackets 26 are mounted upon the outer sides of frame members 18 in such fashion as to lie in generally horizontal planes when the frame members are in assembled relationship.

Three or more of the frame members shown in Figures 3 and 4 could be joined together by bringing their cooperating hinge members into alignment and passing hinge pins 32 therethrough, thus to facilitate the transplanting of trees of different sizes.

A corner plate 34 (Figure 6) is mounted on the adjacent ends of the frame members 18 after the latter are assembled, as illustrated in Fig. 9. Each corner plate is provided with a pair of lugs 36 which receive and hingedly mount one end of a brace rod 38 (Figure 8) formed as a turnbuckle and adjustable as to length by means of a threaded turnbuckle element 40. The other end of each rod is hingedly connected to a concave plate 42 (Figure 7) by means of a pair of lugs 44 formed thereon.

In Figure 9 the device is shown as assembled around a tree with the balling operation partially completed. It will be seen that four of the frame members 18 are joined together by means of corner plates 34 and hinge members 28, 30 and 32. Since the sides of frame members 18 are at an angle, brackets 16 are also at an angle and carry racks 6 at the same angle. The trunk of a tree 46 is engaged by four of the brackets 42 which are supported by brace rods 38. A collar of soft resilient material 47 is placed between the tree and the brackets 42 to prevent damage to the tree trunk by the brackets and the whole assembly is held in place by means of a clamp 49. Thus, it will be seen that as the gears 20 and 22 are rotated, the racks 6 and corresponding plates 2 are moved downwardly.

When all of the plates 2 have been moved into the ground, the lowermost ends of the plates will meet at a common point which will lie in the central axis of the frame beneath the tree, as best shown in Fig. 10. When all of the plates have been thus positioned, the staggered funnel shaped eyes 12 will be in alignment and a retaining rod may then be passed through each series of the aligned members, thus providing a strong locked unitary structure which may be easily removed from the hole dug by the cutting plates. In this condition, the tree and its ball can easily be removed for transportation since the cutting plates will have severed such of the root structure as is unnecessary to be included in the ball.

When digging a hole to receive a tree, the brace rods 38 may be swung outwardly into the position indicated in dot and dash lines in Fig. 9, and, in such position, staked to the ground. This prevents the frame members from being raised from the earth as the plates 2 descend.

Figure 11:
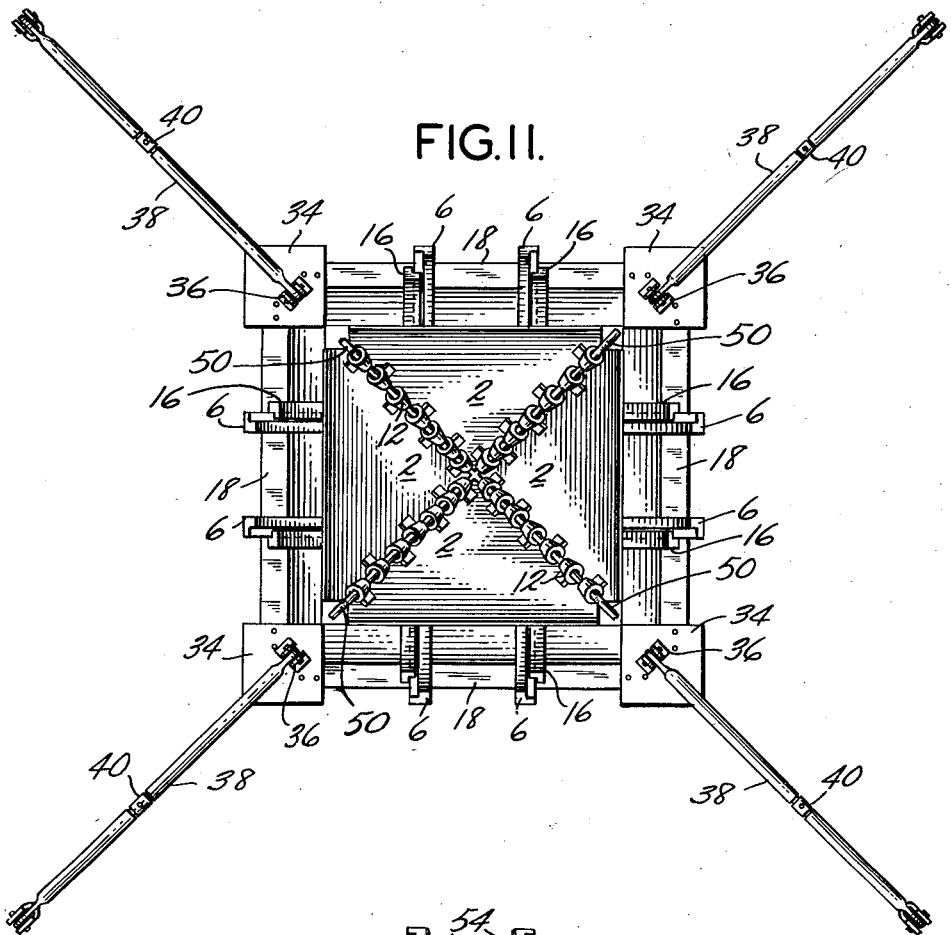
Figure 11 is a plan view in reduced scale showing a modified type of device constructed in accordance with this invention.

Referring to Figure 11, a modified type of device is shown in which the gearing is dispensed with. In this embodiment of the invention, the cutting operation may be performed by driving the plates 2 into the earth with a sledge hammer or other similar well-known means. As illustrated, the plates 2 have been moved into their lowermost position, with the funnel shaped eyes 12 in alignment and, in this position, rods 50 are passed therethrough, thus integrating the elements and enabling the unitary mechanism to lift the severed ball out of the earth.

Figure 12:
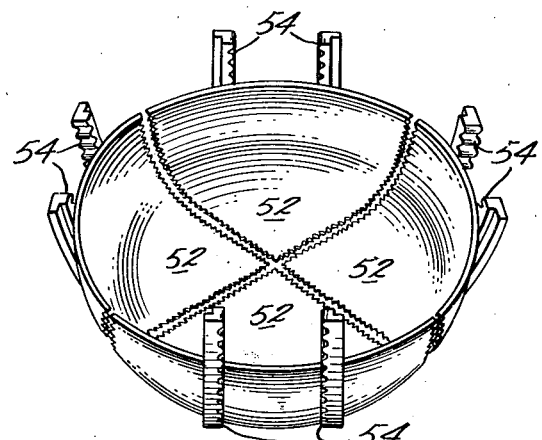
Figure 12 is a perspective view showing a further modified form of cutting plate assembly.

A modified type of cutting plate structure is shown in Figure 12 in which plates 52 are of spherical form and have curved racks 54 secured thereto. Using this structure, it will be seen that as the plates 52 are forced into the earth by the rotation of the gears 20 and 22 against racks 54, the cutting plates will assume the position shown in Figure 12 at the end of the cutting operation.

Figure 15:
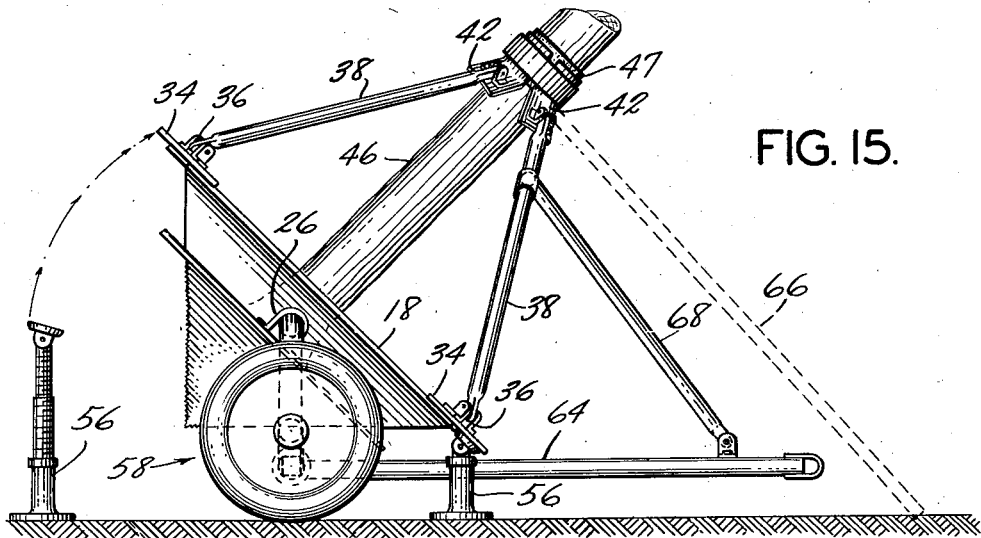
Figure 15 is a further view in elevation showing the device with the tree and ball supported therein and mounted on a two-wheel truck for transport.
Figure 14:
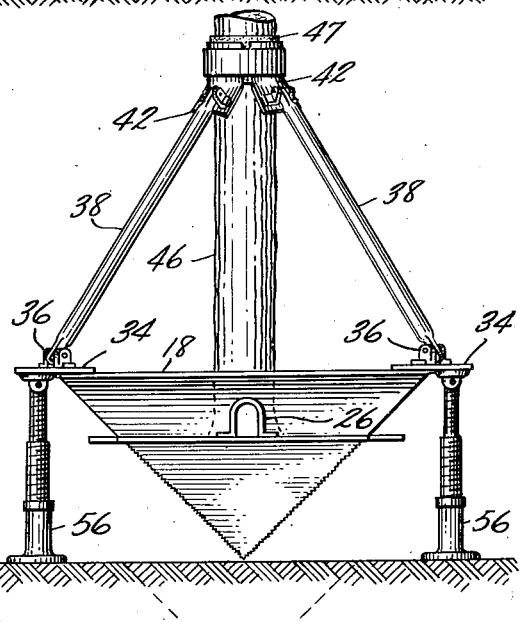
Figure 14 is a view similar to Figure 13 showing the tree and its ball elevated and ready for transportation.
Figure 13:
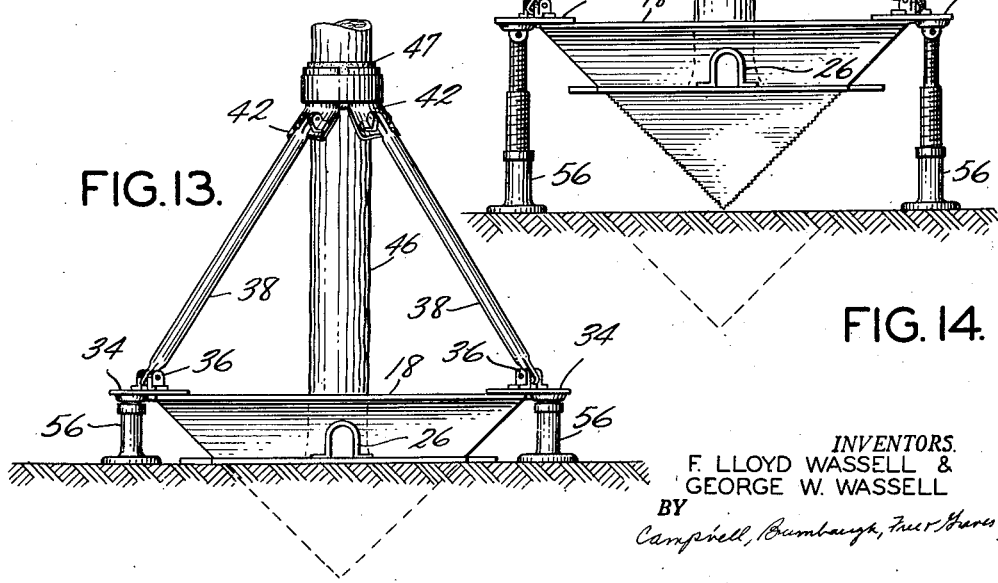
Figure 13 is a view in elevation showing the manner in which a device constructed in accordance with this invention appears after the digging operation has been completed.

Referring to Figures 13 to 15, one means is shown whereby the tree may be readily removed from the hole after the cutting operation is completed. In Figure 13, a jackscrew 56 is shown placed under each corner plate 34. In Figure 14, the jackscrews are shown raised whereby the tree balling device and tree contained therein are removed from the hole dug during the cutting operation.

Figure 16:
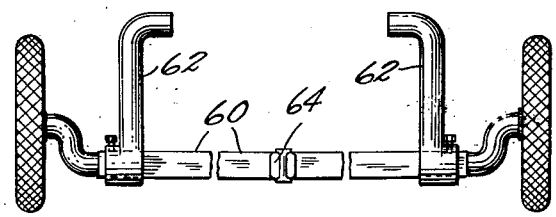
Figure 16 is a view in front elevation of the truck shown in Figure 15.

It is generally advisable to raise the jacks unevenly as shown in Figure 15 whereby the tree and tree balling apparatus may be tilted and a two-wheel truck 58 may be placed thereunder for easily transporting the tree. As shown in Figures 15 and 16, the truck has an axle 60 provided with upstanding L-shaped members 62 for pivotally supporting the tree-balling apparatus and a tongue 64. The upstanding L-shaped members 62 engage beneath U-shaped members 26 on the sides of the frame of the excavating device.

When tilting the balled tree, a temporary bracket 66 may be used to support the tree until a bracket 68 is locked in position between a brace rod 38 and the tongue 64 of the two-wheel truck.

Figure 17:
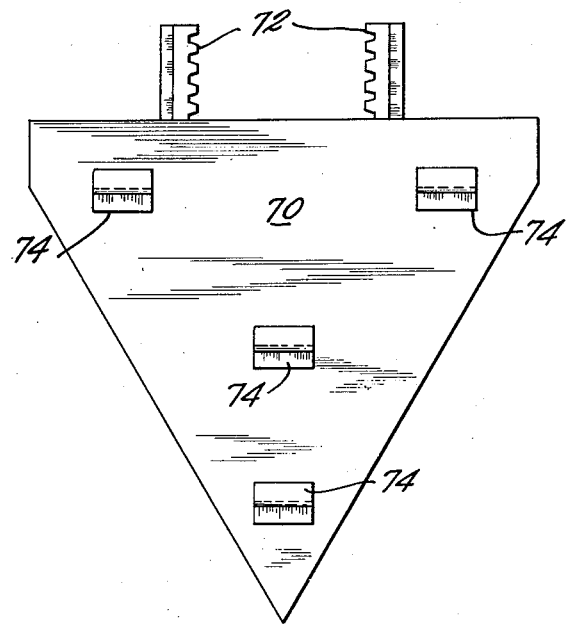
Figure 17 is a view in front elevation showing a form of plate constructed in accordance with this invention and adapted to mount saw mechanisms thereon.
Figure 18:
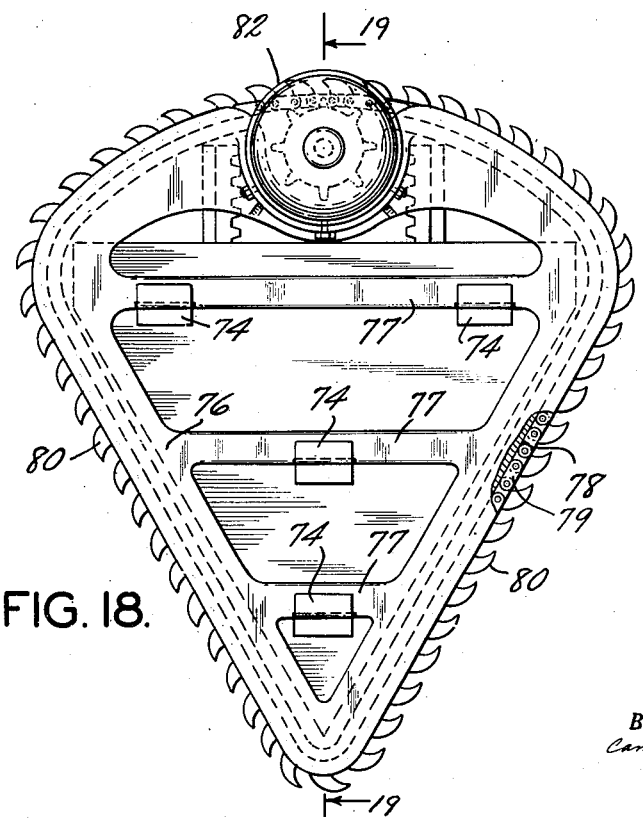
Figure 18 is a view similar to Figure 17 in which a power saw is mounted on the plate.
Figure 19:
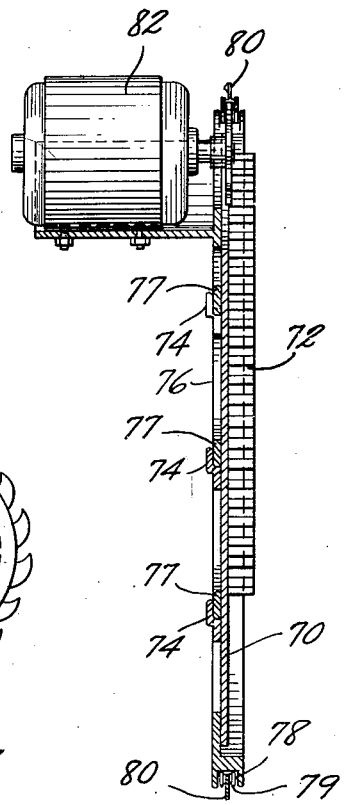
Figure 19 is a sectional view taken on line 19—19 of Figure 18 and looking in the direction of the arrows.

Referring to Figure 17, a modified type of plate 70 is shown having racks 72 affixed thereto and having a plurality of flanged brackets 74 mounted thereon. The brackets 74 support the frame 76 of a power saw such as shown in Figures 18 and 19. The frame 76 has crossmembers 77 and a groove 78 in the periphery thereof in which rides an endless chain 79 having a plurality of saw teeth 80 mounted thereon, the chain and saw teeth being driven by an electric motor 82.

When the frame 76 is placed upon the supporting brackets 74 on the plate 70 and the plate 70 is driven downwardly by means of racks 72, the rotating saw will cut into the earth in a manner similar to the operation of the embodiment shown in Figures 1 to 10, but the operation will be accomplished with less effort.

In using the device, the frame members 18 are assembled about the base of a tree to be transplanted, using any desired number of the frame members, depending upon the size of the tree.

The angle of the sides of the frame members 18 will have to be varied when different numbers of the frame members are linked together. This may be easily accomplished by using hinges. This, instead of the rectangular frame shown in the drawing, any other shape could be used such as triangular, hexagonal or octagonal.

When the frame members are joined together, the plate members 34 are mounted thereon and the supporting rods 38 having plates 42 on the ends thereof are locked around the tree by means of the clamp 49. The brackets 42 may be made of flexible material if desired.

The racks of the cutting plates 2 are then joined in the flanges of the brackets 16 and, by rotating gears 20 and 22, the cutting plates are driven into the earth to perform the cutting operation. The device is best operated by winding the cranks 24 alternately on the back of each side of the frame.

If any rocks or other obstructions are encountered by the cutting plates as they descend into the earth, an aguer or chisel may be passed through tubes 10 to break the rock or other obstruction, or a small quantity of explosive may be tamped in the tubes 10 and detonated, whereby the cutting operation may proceed unimpeded.

When the cutting operation is completed, rods 50 may be inserted through the aligned funnel shaped eyes 12, and the tree may be placed on a transporting truck, as shown in Figure 15, by tilting the tree and the tree balling apparatus on a jack and moving the upstanding arms 62 of the truck into engagement with the U-shaped members 26 attached to the sides of the frame members 18. The tree may then be transported to another location and placed in a hole previously prepared for it using the same apparatus. When the tree and tree balling apparatus is placed in the hole, the operation of the apparatus is reversed, thus removing the tree balling device.

When the modification of the invention shown in Figures 17 to 19 is employed, the frame member 76 is supported by plate 70 and brackets 74 thereon and the motor 82 is started. By rotating gears 20 and 22 against racks 72 the plate 70 descends into the earth and the weight of the frame 76 and motor 82 will provide sufficient pressure on the cutting teeth 80 so that the saw will descend into the earth also and perform one part of the cutting operation analogous to the cuts made by the plates 2 shown in the embodiment of Figures 1 to 10 of the drawings.

Electric motor 82 could be replaced by a gasoline motor or any other similar means for operating the saw. Also, one of the frame members 76 carrying the saw could be employed to make all of the cuts or, alternatively, a plurality of the frame members 76 could be used and all of the cuts could be made substantially simultaneously. The frame 76 also has utility as a separate unit since it can be transported manually and used for other applications than those disclosed in connection with the present invention. For example, it could be held in the hand and used to sever roots and the like.

It will be appreciated by those skilled in the art that many modifications may be made within the scope of the present invention without departing from the spirit thereof, and the invention is to be restricted only in accordance with the appended claims.

We claim:

1. An excavating device comprising a plurality of plates adapted to be driven into the earth at angles to the vertical to meet at a common point below the surface of the earth, and means for locking said plates together including cooperative, separable locking means carried by adjacent portions of adjacent plates and adapted to be driven with said plates to points below the surface of the earth before being joined, the cooperative locking means of adjacent plates being offset along a vertical axis to permit successive plates to be driven into the earth without interference by the locking means, said cooperative locking means coming into alignment when the plates meet at said common point.

2. A tree balling device comprising a plurality of plates adapted to be driven into the earth around a tree at angles to the vertical to meet at a common point below said tree, means for locking said plates together including cooperative, separable locking means carried by adjacent portions of adjacent plates and adapted to be driven with said plates to points below the surface of the earth before being joined, the cooperative locking means of adjacent plates being offset along a vertical axis to permit successive plates to be driven into the earth without interference by the locking means, said cooperative locking means coming into alignment when the plates meet at said common point, and means for supporting said tree relative to said plates.

3. An excavating device comprising a frame, a plurality of plates mounted on said frame, said plates being adapted to be driven into the earth at angles to the vertical to meet at a common point below the surface of the earth, and means for locking said plates together including cooperative, separable locking means carried by adjacent portions of adjacent plates and adapted to be driven with said plates to points below the surface of the earth before being joined, the cooperative locking means of adjacent plates being offset along a vertical axis to permit successive plates to be driven into the earth without interference by the locking means, said cooperative locking means coming into alignment when the plates meet at said common point.

4. A tree balling device comprising a frame, a plurality of plates mounted on said frame, said plates being adapted to be driven into the earth around a tree at angles to the vertical to meet at a common point below said tree, means for locking said plates together including cooperative, separable locking means carried by adjacent portions of adjacent plates and adapted to be driven with said plates to point below the surface of the earth before being joined, the cooperative locking means of adjacent plates being offset along a vertical axis to permit successive plates to be driven into the earth without interference by the locking means, said cooperative locking means coming into alignment when the plates meet at said common point, and means attached to said frame for supporting said tree.

5. A tree balling device comprising a frame, gear means mounted on said frame, and a plurality of plates mounted on said frame, said plates having rack means thereon meshing with said gear means, said plates being adapted to be driven into the earth around a tree by said rack and gear means and adapted to meet at a common point below said tree.

6. A tree balling device comprising a frame, a plurality of plates movably mounted on the frame, said plates being adapted to be driven into the ground to meet at a common point below the tree to form a tree ball, mounting brackets on said device, and vehicle means engageable with the frame for transporting the device and a tree held therein comprising wheel means, an axle supported by the wheel means and adapted to underlie said device, a tongue portion, a bracing arm member adapted to be attached to the tongue member and to the tree at a point spaced upwardly from the ball, and pivot members on said vehicle means for engaging the mounting brackets of said device whereby the tree ball, the tree and the tree balling device may be inclined to the vertical.

7. A tree balling and excavating device comprising frame means to rest on the earth around a tree to be balled or an area to be excavated to receive a balled tree, a plurality of plate members mountable on the frame and adapted to be driven into the earth to carve out an excavatable earth mass, a plurality of supporting members and means to pivotally attach the supporting members to the frame means to swing between an upstanding, tree trunk supporting position in which the free ends of the supporting members can be attached to the tree trunk above the ground level whereby a tree, a tree ball and said device can be moved as one, said supporting members also being adapted by virtue of said pivotal connection to be swung to positions extending outwardly from the frame means and with their free ends resting on the earth to be staked thereto, whereby the frame means can be secured against movement from the earth as the plate members are driven into the earth.

8. A device as set forth in claim 7 including complementary gear means on said frame means and plate members, and driving means to turn the gear means on the frame means to drive the plate members into the ground, said supporting members preventing the frame means from raising off the ground.

9. A device as set forth in claim 1 including means fixed to at least one of said plates and adapted to guide a tool into the earth in advance of said plate to assist the passage of the plate into the earth.

10. A device as set forth in claim 9, said means to guide a tool into the earth comprising downwardly directed tubular members secured to the outer surface of the plate to extend downwardly from a point adjacent the upper edge of the plate.

References Cited in the file of this patent

UNITED STATES PATENTS

| | | |
|---|---|---|
| 357,197 | Harsin | Feb. 8, 1887 |
| 594,668 | Wilkens | Nov. 30, 1897 |
| 1,763,790 | Kaltenbach | June 17, 1930 |
| 1,964,905 | Butterworth | July 3, 1934 |
| 2,219,690 | Leydecker | Oct. 29, 1940 |
| 2,243,955 | Gwathmey | June 3, 1941 |